United States Patent [19]

Perrin

[11] 3,761,813

[45] Sept. 25, 1973

[54] METHOD OF TELECOMMUNICATION VIA SATELLITE AND SYSTEMS USING THIS METHOD

[75] Inventor: Jacques Perrin, Paris, France

[73] Assignee: Thomson-CSF, Paris, France

[22] Filed: Mar. 17, 1972

[21] Appl. No.: 235,548

[30] Foreign Application Priority Data

Apr. 6, 1971 France ............................ 7112142

[52] U.S. Cl. .................... 325/4, 179/15 BS, 325/58, 343/7.5, 343/100 SA

[51] Int. Cl. ............................................ H04b 7/20

[58] Field of Search ..................... 325/4, 51, 39, 40, 325/58; 179/15 AD, 15 BS, 15 A; 343/7.5, 100 SA

[56] References Cited

UNITED STATES PATENTS 3,622,885 11/1971 Kruszynski.......................... 325/40

3,678,387 7/1972 Wilson................................. 325/4

*Primary Examiner*—Benedict V. Safourek
*Attorney*—John W. Malley et al.

[57] ABSTRACT

A method of telecommunication via a stationary active satellite between a ground station and airborne stations, using a time and frequency division multiplex transmission in which the frame duration and that of each signal sample of each link are determined so that, the indirect reception by "multipath effect" is produced beyond the direct reception durations of the successive samples for each link considered. The reception on board is thus obtained by filtering received signals on the frequency link concerned and by making inoperative the receiver beyond the direct reception of the successive samples of the link in question.

8 Claims, 8 Drawing Figures

METHOD OF TELECOMMUNICATION VIA SATELLITE AND SYSTEMS USING THIS METHOD

The present invention relates to a method of telecommunication via satellite as well as to the systems using this method.

An important innovation has been made to long distance communication techniques by the use of artificial satellites of the earth as amplifying relays, or even simply as radio-electric wave reflectors, to effect links between stations spaced apart on the ground. Thus the waves no longer have to follow the spherical surface of the earth which causes considerable attenuation of them, or be reflected on an ionosphere formed of moving layers of electrons, modifications of which cause serious fluctuations in the received signals and are a frequent cause of interruptions in radiotelephone or radiotelegraphic traffic.

Satellites acting as amplifying relays are referred to as "active" and, on the contrary, those used as simple wave reflectors are referred to as "passive". When the duration of revolution of a satellite is equal to that of the earth, it appears fixed to a terrestial observer and is referred to as "stationary". The positioning of such a satellite is effected on an equatorial orbit approximately 36.000 km in altitude. Distribution of a limited number of active stationary satellites enables the whole of the globe to be covered from the aspect of telecommunications with a great distance between several stations. It is considered that the stations may consist of fixed stations such as ground stations, quasi-fixed, such as stations on board marine craft, or even moving stations on board an aircraft in flight. The altitude of flight or travel of the latter is situated in a range, for example between 6,000 and 12,000 m, and remains very small compared to that of the satellite.

This invention is intended for space telecommunication systems of the kind including a stationary active satellite, one or more fixed (or quasi-fixed) stations and a plurality of stations on board aircraft in flight, called "airborne stations".

A major drawback occurring in links by satellites with aircraft in flight is due to the attenuations of the signal caused by interferences between the direct wave and that received indirectly after reflection from the ground or the sea. This phenomenon is referred to as multi-path effect.

Protection against the multi-path effect can be obtained by using on board the aircraft antennas having a sufficiently directive radiation pattern. In this manner the reflections issuing from sites below the aircraft are greatly attenuated and their harmful effect is much reduced. On the other hand, the cost of such antennas is high and their large dimensions render their installation on the aircraft difficult.

It is an object of the invention to provide a space telecommunication system avoiding these drawbacks and limitations.

There is used between the satellite and aircraft a transmission of the Time Division Multiplex type, called TDM, the information being coded in digital form. The TDM method is characterised by the transmission of successive sequences called frames, of predetermined time duration T. This frame duration is divided into elementary intervals of time or channels which are effected successively and respectively in a determined order at the different stations envisaged for multiplex transmission on course. The number of channels defines the maximum number of simultaneous links which can be envisaged. The processing of the signal to be transmitted for each link consists generally of a sampling followed by digital coding and time compression; the resulting signal is intended to modulate, in phase or in frequency, a high frequency transmission carrier. The mode TDM of transmission enables, by time selection upon reception, to eliminate the parastic signals relative to the link in question.

In addition to the time selection, the simultaneous links are effected on separate carrier transmission frequencies. A first carrier transmission frequency is affected to a first channel, a second transmission frequency different of the latter to a second channel and so on. The transmission is so divided in time and in frequency. The reception on an airborne station may thus be unaffected by filtering of the undesirable signals caused by the multi-path effect and due to links other than those for which this station is intended.

According to the present invention it is provided a method of telecommunication via a stationary active satellite with stations including airborne stations wherein the frame period and the sample duration are determined so that, for each link, the indirect reception on an airborne station by multi-path effect of a sample is ever produced in the interval between the end of the direct reception of the said sample and the beginning of direct reception of the following sample of the link in question, said interval being at least equal to the maximum extent of the said indirect reception determined by taking account of the altitude range of said airborne stations and of the elevation angle range of the satellite in the operational zone covered, separate transmission carrier frequencies being attributed to the different channels, so as to distinguish the signals by filtering upon reception on board the aircraft, each reception on board being made inoperative beyond the direct reception durations of successive samples of the link in question.

The invention will better be understood when considered in the light of the following description in connection, with the accompanying drawings, in which.

Figure 1:
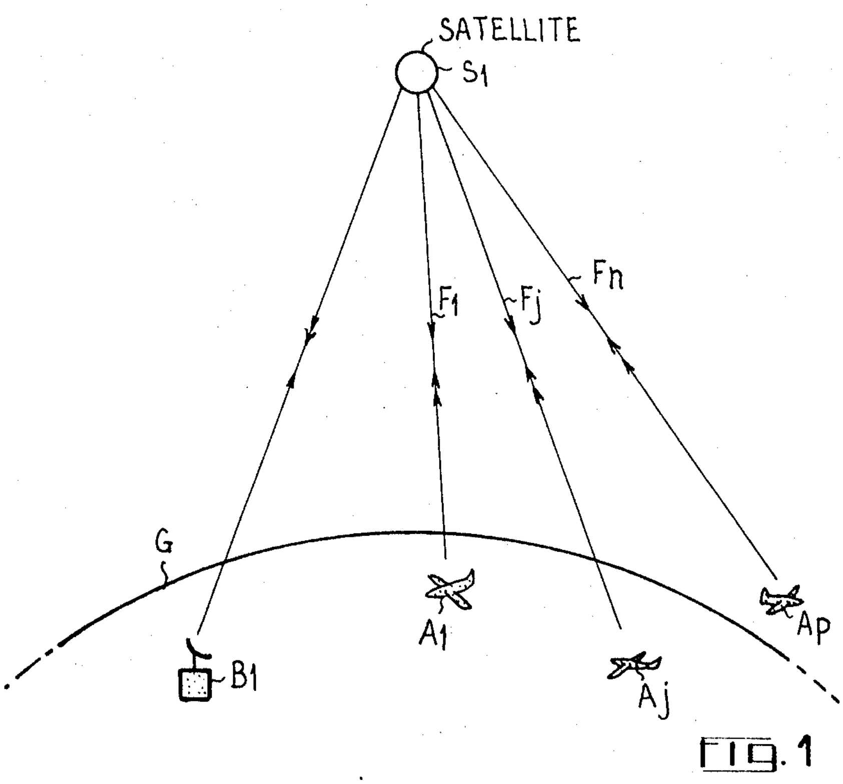
FIG. 1 is a basic diagram of a space telecommunication system concerned by the invention.

The invention relates to systems of telecommunication of the type shown in the simplified diagram of FIG. 1, in which a stationary satellite S1 is used as an amplifier relay between a plurality of stations comprising at least one ground station such as B1 and a plurality of stations $A_1$, $A_J$, $A_P$ on board aircraft in flight. It is understood that the positioning of the stations remains in the field cone covered by satellite. The latter is positioned at an altitude of approximately six times the radius of the earth and may cover optically a large area of the globe G defining the maximum area of use. The illumination of the operational area may be effected by the satellite in different manners, according to the radiating technique used.

Figure 2:
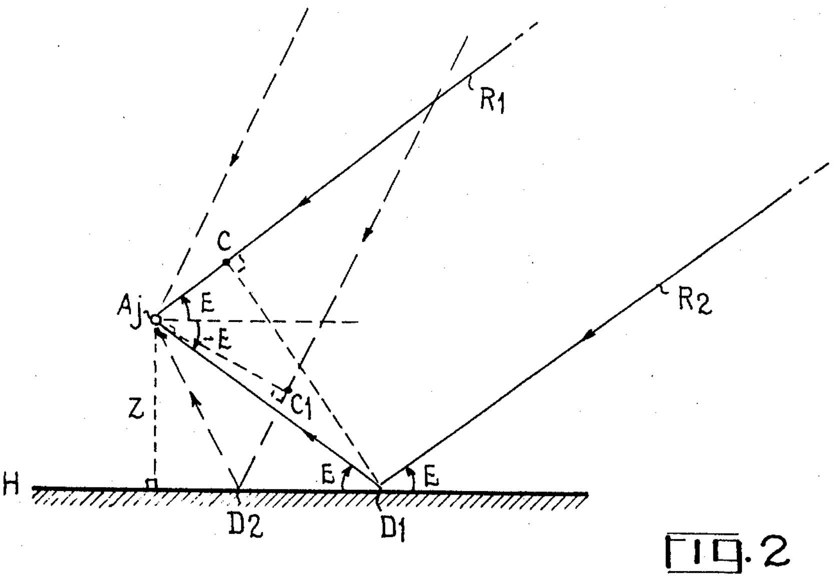
FIG. 2 is a diagram showing the production of an interference phenomenon by multi-path effect.

FIG. 2 shows the phenomenon of the interferences caused upon reception on board the aircraft by a multi-path effect. The directions of propagation $R_1$, $R_2$ followed by the waves which reach an aircraft $A_j$ on the one hand directly, and on the other hand after reflection on the horizon plane H, may be considered substantially parallel having taken into account the spacing from the satellite $S_1$ and its very great altitude compared to that Z of the aircraft. The wave of direction $R_2$ is reflected from the ground at $D_1$ and interferes at $A_j$ with the direct wave $R_1$. The lapse of time which separates a signal from the echo signal is related to the difference in the path which depends on the altitude Z of the aircraft and on the angle of elevation E of the satellite. If $T_R$ represents this lapse in time, $T_R$, Z and E are related by the approximate formula $T_R = 2Z \sin E/c$, $c$ being the speed of light and $2Z \sin E$ the difference of paths equal to $D_1A_j - A_jC$, in the case, or to $D_2A_j + D_2C_1$, in the second case illustrated with dotted-lines where the satellite is considered at a much high elevation. The approximation made results from the fact that the directions $R_1$, $R_2$ of the waves are considered parallel and that the portion of the earths surface H is assimulated to a specular or semi-specular plane of reflection. Experience proves nevertheless that the value of $T_R$ is supplied with great accuracy under these conditions of approximation.

The altitude $Z$ of the aircraft varies in a limited range, previously known for example, between a minimum value $z_o = 6,000$ m and a maximum value $Z_1 = 12,000$ m. On the other hand, the angle of elevation E of the satellite varies, according to the positioning of the airborne stations of be linked in the envisaged field, between a minimum value $E_o$, for example 10°, and a maximum value $E_1$ which may attain 90°.

The duration $T_R$ is thus comprised between two values $T_0$ and $T_1$ which are respectively equal, in the numerical example in question, to approximately 10 $\mu$s and approximately 80 $\mu$s. It should be noted that the values of $T_R$ greater than 45 $\mu$s correspond to elevations higher than approximately 35° and consequently to parasitic echos received after reflection from elevation lower than − 35° by the receiver of the aircraft. Now, an antenna of even modest gain can already give high protection against parasitic radiations received from these directions.

Figure 3:
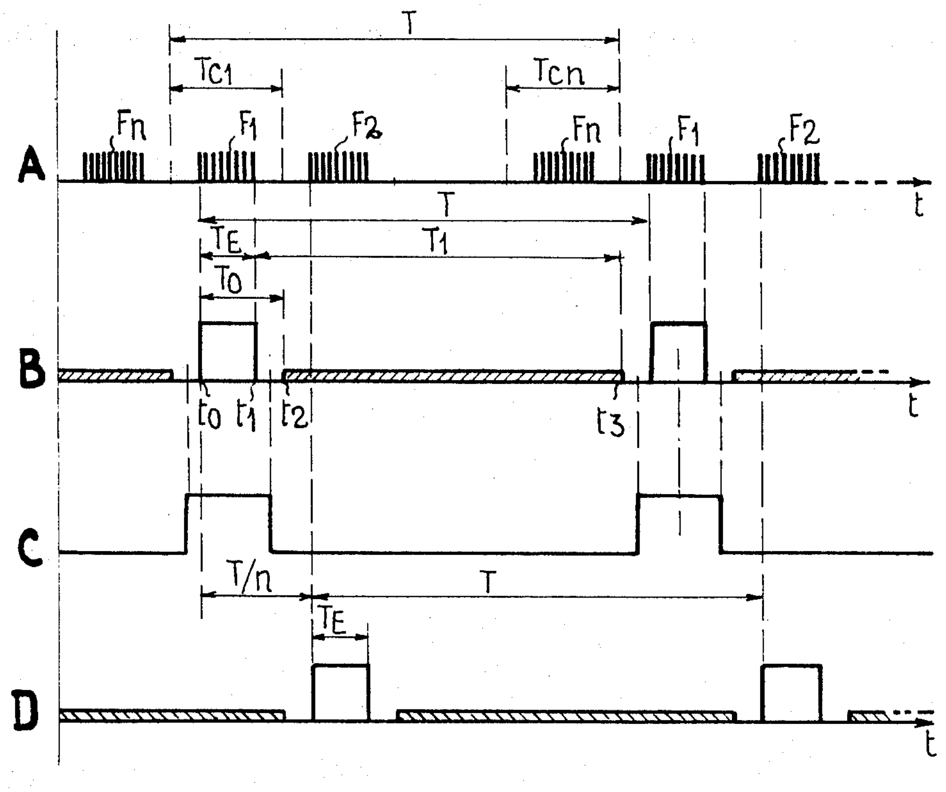
FIg. 3A to 3D are waveforms relative to the TDM mode of transmission and to the method used in accordance with the invention.

Transmission is effected in accordance with the time division multiplex method or TDM, described briefly hereinafter with the aid of FIG. 3A. The signal for each of the links is transmitted during successive frames of duration T and is attributed to a channel of given order in the frame, the latter being divided into $n$ channels enable $n$ simultaneous links. To this end the signal is previously processed by sampling, digital coding and time compression. Thus, the information in digital form transmitted during each channel corresponds to a sample of duration T of the original corresponding signal. The duration of transmission $T_E$ of this sample is usually somewhat shorter than that of the channel which is given by $T/n$ for a regular division of the frame.

The sample duration $T_E$ and its recurrence frequency T are determined in a manner to be free from the interference phenomena by the multi-path effect between signals relative to the link in question. In a more precise manner, as shown on the diagram 3B, where the link considered is, for example, that transmitted by the first channel of the frame; the successive emissions are effected for this link, for the satellite, by sample of duration $T_E$ at the rate of frame T and are further received, under the same conditions on board the aircraft to which the link is attributed. To the instant $t_o$ of start of reception of a sample corresponds the reception of corresponding parasitic echos between the time $t_2 = t_o + T_o$ and the time $t_o + T_1$. To the time $t_1$ of end of reception of the sample corresponds parasitic echos located in time between $t_1 + t_o$ and $t_3 = t_1 + T_1$. By respecting the double condition that, the duration $T_E$ of the sampling period is less than $T_o$ and that, the duration of frame T is greater than $T_E + T_1$, the parasitic echos of the link considered situated between $t_2$ and $t_3$ cannot interfere with the useful signals received directly between $t_o$ and $t_1$. At the time $t_2$, the reception of the sample is terminated and the reception of the following sample of this link is later than the time $t_3$ and so on.

Separate transmission frequencies are used for the different links transmitted respectively during successive channels of the frame, so as to be able to eliminate the possible interference phenomena by the multi-path effect between the useful signals of the transmission channel in question received directly and reflected parasitic signals relative to other channels and received simultaneously. The parasitic signals due to other links are situated in intervals $t_3 - t_2$ shifted respectively by a channel duration to the following, of $T/n$ in the assumption of a regular time distribution. By way of example, the graph 3D shows the useful and parasitic signals of the link corresponding to the second channel of the frame and shows that during the useful interval $T_E$ of reception from the channel 1, interference phenomena are possible between parasitic signals of the channel 2 (3D) resulting from the transmission of the preceding frame and the useful signals (3B) of the channel 1 in question.

The attribution of separate frequency bands to successive channels enables these parasitic signals to be eliminated by filtering upon reception.

The different conditions required may be obtained by transmitting a signal TDM of frame duration T greater than or at least equal to $T_E + T_1$ and comprising $n$ successive samples on $n$ different frequencies intended for as many stations. The spacing of the frequencies must be determined so as to allow an easy discrimination upon reception by filtering taking into account the alterations caused by the drifts and Doppler effect. The duration of transmission $T_E$ must be less than $T_o$ and also less than or at the most equal to that $T/n$ of a channel duration.

By considering that the antenna on board produces sufficient protection for the elevations less than 35° for example, it is possible to select the duration T of the frame less than the value $T_E + T_1$ wherein $T_1$ corresponds more particularly to the maximum value of the angle E of elevation, namely 90°.

In another manner, if the number of channels is large and the duration T of the frame is large with respect to the duration $T_E + T_1$ and is a multiple of this value, it is possible to use a total number of separate frequencies less the number of channels $n$. If for example, $T = 2(T_E + T_1)$ and $n$ is even, the number of frequencies may be divided by two and the same frequency may be used by channels shifted respectively by $T_E + T_1$ in time.

The elimination of the parasitic signals received outside of the useful periodic duration $T_E$ is effected, either by blocking the input of the receiver outside of the useful instants, or by time handling of the signals received and rejection of the data situated outside of the useful intervals.

Figure 4:
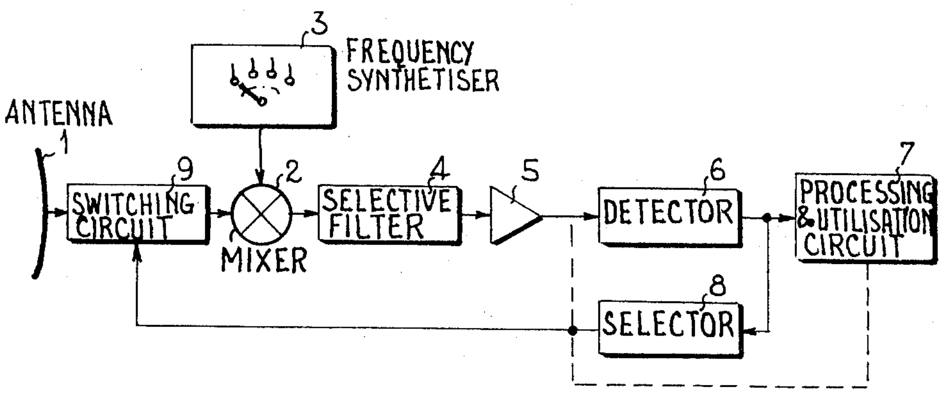
FIG. 4 is a simplified diagram of an on-board receiver according to the invention.

FIG. 4 shows a simplified diagram of a receiver that is installed on board an aircraft. The signals received by an antenna 1 are transposed in intermediate frequency by a mixer circuit 2 receiving a local frequency from an oscillator 3. The latter is, preferably, formed by a frequency synthesiser producing the different local heterodyne frequencies corresponding to the different transmission frequencies of the frame. The operator may thus select its prescribed frequency corresponding to the link in question in accordance with the programme of the transmission in course, this frequency being able to be modified according to the needs of operation. The intermediate frequency signal is applied to a selective filter circuit 4 eliminating the parasitic signals due to other links, and is then amplified in a circiuit 5 before detection at 6. The demodulated output signal corresponds to the digital signal of the sample. This signal is applied to a processing and utilisation circuit 7. Protection in relation to the echo signals of the attributed link is effected by time selection of these signals received during the useful cyclic durations of reception $t_0$ to $t_1$ (FIG. 3B). A selective circuit 8, such as a bit-synchroniser circuit develops from the demodulated signal and by amplitude discrimination of the useful signals and the echo signals, a time selection signal. This signal may have the shape indicated on FIG. 3C and is formed of cyclic windows centred on the useful cyclic durations or reception. The width of the window is determined substantially equal to $T_E$ or slightly greater than this value according to the value adopted for the duration of frame $T$. The selection signal may be used, as shown, to control a switching circuit 9 which blocks the receiver outside the time intervals of the windows. The switching circuit may according to another version be placed at another position in the receiver chain, for example between the amplifier 5 and the detector circuit 6. Another solution consists in applying the selection signal to the processing circuit 7 to effect rejection of the undesirable signals.

Figure 5:
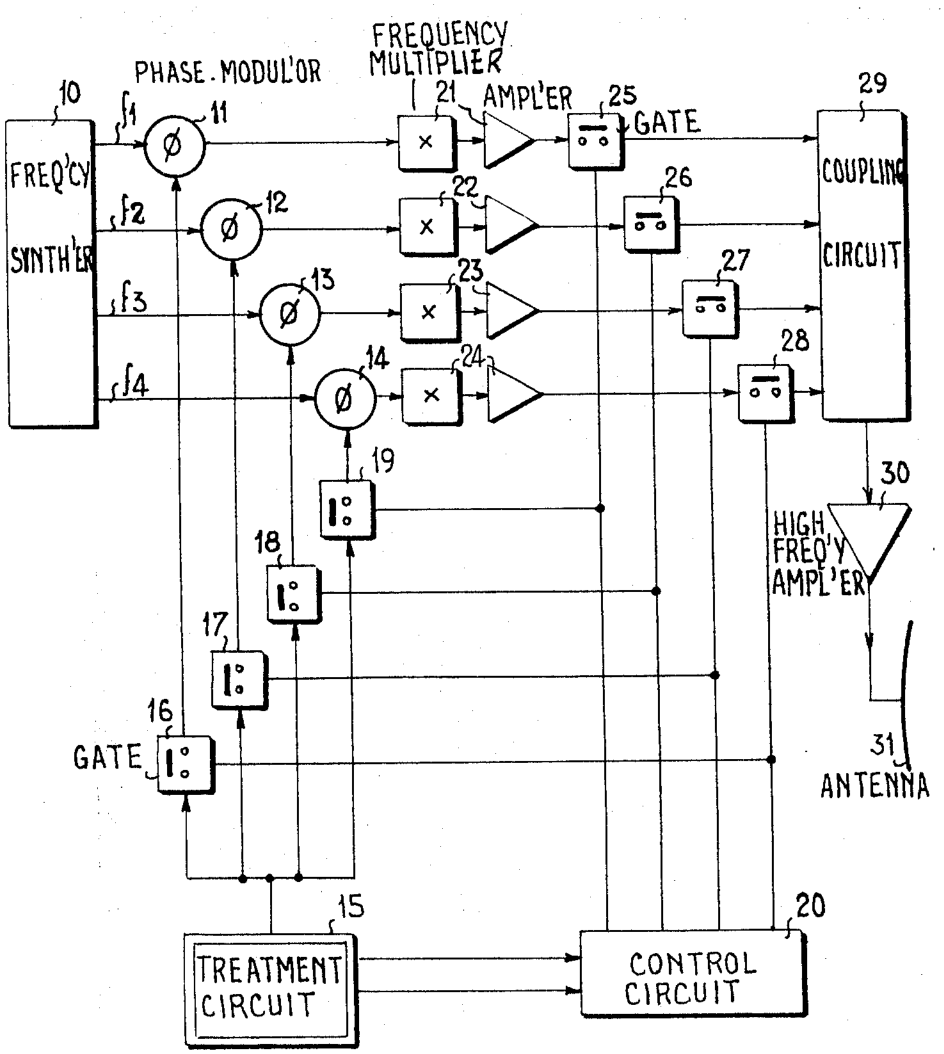
FIG. 5 is a simplified diagram of transmitter circuits according to the invention.

FIG. 5 shows a simplified diagram of the transmission equipment which, according to the invention, may be provided at a ground-station and which radiates in the direction of the relay satellite. A frequency synthetiser 10 produces for each transmission frequency subharmonic of this frequency, namely $f_1, f_2, f_3, f_4$, by considering by way of simplification a number of links and channels equal to 4. These signals are applied respectively to a phase modulator 11, 12, 13 and 14. The phone channel signals to be treated are translated in digital form into a train of pulses supplied at the output from a treatment circuit 15. This train is formed by the different samples to be transmitted successively and is applied simultaneously to the inputs of the gate circuits 16 to 19. The latter are triggered in accordance with the successive channels in a manner to transmit to the associated modulator channels in a manner to transmit to the associated modulator the sample corresponding to the channel in question. This time coordination is obtained by a control circuit 20 of the register type, controlled by frame and channel synchronisation signals. The intermediate carriers $f_1$ to $f_4$ are phase modulated during respectively one channel duration in the course of each frame and then applied to frequency amplifier multiplier units 21 to 24. The transposition in frequency is effected at the transmission frequency $F_1$ to $F_4$. The rejection of the signal from each channel outside of the corresponding useful duration $T_E$ is effected by gate circuits 25 to 28 controlled in synchronism and in the same order as the gate circuits 16 to 19. A coupling circuit 29 regroups the different outputs into a single output supplying a high frequency amplifier 30, such as a travelling wave tube connected to an antenna 31 supplying a fine beam of high directivity oriented towards the satellite.

I claim:

1. A method of telecommunication via a stationary active satellite, for transmitting respective messages to a plurality n of airborne receivers through said satellite, said method comprising the following steps:

processing said messages and modulating them respectively on separate carriers having separate frequencies to which said receivers are respectively tuned to obtain successively and periodically n modulated carrier samples according to a time division multiplex transmission mode;

transmitting said samples through said satellite towards said airborne receivers, the period spacing between and the duration of said samples being determined such, that the samples having a given carrier frequency are received directly on an airborne receiver tuned on said frequency at time intervals beyond those at which occurs reception of said samples having said carrier frequency after being reflected from ground towards said receiver; and making inoperative by time selection the reception on board beyond the intervals of direct reception of samples having the carrier frequency on which is tuned the corresponding airborne receiver.

2. A method of telecommunication according to claim 1, wherein said period is an entire multiple at least equal to twice the time interval between the initial time of direct reception of a sample and the maximum terminal time of indirect reception of said sample, the carrier frequencies distributed in a first, time interval of said period being redistributed in the same order for the second following equal time interval, and so on.

3. A telecommunication system for carrying out the method according to claim 1 wherein a transmitter of a ground station radiates towards the satellite a multiplex signal divided in time and having n separate carrier frequencies; a receiver, on each of said airborne stations, of the heterodyne and preset frequency type and provided with spectral filtering means and time selection means for the useful reception signals, said selection means comprising, a selection circuit for producing a time selection signal from the output signal of detection circuits, and a switching circuit positioned in the receiving chain upstream of said detection circuits and receiving said time selection signal.

4. A telecommunication system for carrying out the method according to claim 1 wherein a transmitter of a ground station radiates towards the satellite a multiplex signal divided in time and having n separate carrier frequencies; a receiver, on each of said airborne stations, of the heterodyne and preset frequency type and provided with spectral filtering means and time selection means for the useful reception signals, the said selection means comprising, a selection circuit producing a time selection signal from the output signal of detection circuits, said time selection signal being applied to a processing and utilization circuit which is supplied with the detected signals.

5. A method of telecommunication via a stationary active satellite for transmitting respective messages to a plurality *n* of airborne receivers, said method comprising the following steps:

splitting each message into equal sections of duration *T;* processing each station by sampling, digital coding and pulse compression to obtain a modulating signal of duration at most equal to *T/n;* modulating a UHF wave with *n* successive modulating signals corresponding respectively to a section of a said *n* messages to produce a time-division multiplex transmission signal having said value *T* as a period, said UHF wave having *n* separate carrier frequencies attributed respectively to said *n* messages;

transmitting said UHF modulated wave through said satellite to a determined operational zone for providing *n* simultaneous links with the *n* airborne receiver stations, respectively;

receiving said UHF wave at said airborne receivers;

filtering the received signals, each airborne receiver being tuned at one of said separate frequencies;

making inoperative by time-selection the reception on board beyond the intervals of direct reception of signals of the link in question having the carrier frequency to which the corresponding airborne receiver is tuned, said time-selection having a duration at most equal to the valve *T/n* and recurring with the period *T*, said time modulation signal duration and said period *T* being determined such that the indirect reception of signals of the link having said carrier frequency, after being reflected from ground toward said carrier frequency, after being reflected from ground toward said receiver, occurs at time intervals beyond the direct reception of said message signal, the time interval of indirect reception being determined in relation to the altitude range of said airborne station and to the elevation angle range of said satellite in said operational zone; and processing said filtered and time-selected received signals to reproduce at said receiving station the message transmitted by the link.

6. A method of telecommunication via a stationary active satellite comprising the following steps:

splitting each message into equal sections of duration *T;* processing each section by sampling, digital coding and pulse compression to obtain a modulating signal of duration at most equal to *T/n; T/n;* modulating a UHF wave with n successive modulating signals corresponding respectively to a section of said n messages, to produce a time-division multiplex transmission signal having said value *T* as a period, said UHF wave having a number *m* less than *n* separate frequencies successively attributed to the first *m* modulating signals respectively and recurring for the second *m* modulating signals and so on during each period;

transmitting said UHF modulated wave through said satellite to a determined operational zone for providing *n* simultaneous links with the *n* airborne receiver stations respectively;

receiving said UHF wave at said airborne receivers;

filtering the received signals, each airborne receiver being tuned to one of said separate frequencies;

making inoperative by time-selection, the reception on board beyond the intervals of direct reception of signals of the link in question having the carrier frequency to which the corresponding airborne receiver is tuned, said time-selection having a duration at most equal to the value *T/n* and recurring with the period *T*, said time modulating signal duration and said period *T*being determined such that the indirect reception of signals of a link having said carrier frequency after being reflected from ground towards said receiver occurs at time intervals beyond the direct reception of said message signal, the time interval of indirect reception being determined in relation to the altitude range of said airborne station and to the elevation angle range of said satellite in said operational zone, said period *T* being an entire multiple at least equal to twice the time interval between the initial time of direct reception of a section and the final time of indirect reception of the said section, the carrier frequencies distributed in a first time interval of said period being redistributed in the same order for the second following equal time interval, and so on; and processing said received signals filtered and time-selected to reproduce at said receiving station the message transmitted by the link.

7. A telecommunication system for carrying out the method according to claim 5, comprising:

a ground station comprising means for generating and for radiating toward said satellite a UHF wave transmitted according to time-division multiplex transmission and in which separate carrier frequencies are attributed to the n links, respectively;

a stationary active satellite receiving said UHF wave and retransmitting it in turn to said airborne receivers;

A pluraltity of airborne stations each including an airborne receiver which is of the heterodyne and preset frequency type and provided with spectral filtering means and time-selection means, said selection means comprising a selection circuit for producing a time-selection signal from the output signal of detection circuits and a switching circuit being positioned in the receiving chain upstream of said detection circuits for receiving said time-selection signal.

8. A telecommunication system for carrying out the method according to claim 5, comprising:

a ground station comprising means for generating and for radiating toward said satellite a UHF wave transmitted according to time-division multiplex transmission and in which separate carrier frequencies are attributed to the n links, respectively;

a stationary active satellite receiving said UHF wave and retransmitting it in turn to said airborne receivers;

a plurality of airborne stations each including an airborne receiver which is of the heterodyne and preset frequency type and provided with spectral filtering means and time-selection means, said selection means comprising a selection circuit for producing a time-selection signal from the output signal of detection circuits, said time selection signal being applied to a processing and utilization circuit supplied by the detected signals.

* * * * *